US006935983B2

(12) United States Patent
Pecnik

(10) Patent No.: US 6,935,983 B2
(45) Date of Patent: Aug. 30, 2005

(54) FINAL DRIVE ASSEMBLY WITH DIFFERENTIAL LOCK

(75) Inventor: Hermann Pecnik, Nestelbach (AT)

(73) Assignee: Magna Steyr Fahrzeugtechnik AG&Co KG, Graz (AT)

( * ) Notice: Subject to any disclaimer, the term of this patent is extended or adjusted under 35 U.S.C. 154(b) by 0 days.

(21) Appl. No.: 10/398,358

(22) PCT Filed: Oct. 4, 2001

(86) PCT No.: PCT/AT01/00317

§ 371 (c)(1),
(2), (4) Date: Sep. 22, 2003

(87) PCT Pub. No.: WO02/28678

PCT Pub. Date: Apr. 11, 2002

(65) Prior Publication Data

US 2004/0053725 A1 Mar. 18, 2004

(30) Foreign Application Priority Data

Oct. 4, 2000 (AT) .................................. GM733/2000

(51) Int. Cl.[7] .............................................. F16H 48/20
(52) U.S. Cl. ..................................... 475/249; 475/205
(58) Field of Search ................................ 475/200, 204, 475/205, 249

(56) References Cited

U.S. PATENT DOCUMENTS

| 2,837,936 A | | 6/1958 | Fackler, Jr. |
| 3,494,226 A | * | 2/1970 | Biddle ........................ 475/249 |
| 3,528,323 A | * | 9/1970 | Kamlukin ............... 475/249 X |
| 5,194,058 A | * | 3/1993 | Amborn et al. ......... 475/249 X |

FOREIGN PATENT DOCUMENTS

| JP | 02-248743 | * 10/1990 | ................. 475/249 |

* cited by examiner

Primary Examiner—Ha Ho
(74) Attorney, Agent, or Firm—Bachman & LaPointe, P.C.

(57) ABSTRACT

Axle-drive unit for a motor vehicle which contains a first and a second differential (18, 19) in a driven housing (22), the two differentials (18, 19) being spur-gear-type planetary gears with parallel axes, the sun wheels (32, 43) of which are in each case connected in terms of drive to the half axles (8, 9) of the first driven axle, and planet wheels (36, 38) of the two differentials (18, 19) meshing with their common ring gear (35). The housing (22) has a machined inner surface (50) which surrounds the ring gear (35) with little clearance, the ring gear is so thin in the radial direction that it is deformed in a lobe-like manner by the radial component of the tooth forces exerted by the planet wheels (31, 36). The outer circumferential surface (60) of the ring gear is placed against the inner surface (50) of the housing (22) in a manner producing friction at least locally.

4 Claims, 3 Drawing Sheets

FINAL DRIVE ASSEMBLY WITH DIFFERENTIAL LOCK

BACKGROUND OF THE INVENTION

The invention involves an axle-drive unit for motor vehicles having a first and a second driven axle which contains a first and a second differential in a housing driven by an engine/transmission block, the first differential dividing the torque fed to it between a first half axle of the first driven axle and the second differential, and the latter furthermore dividing the torque fed to it between a second half axle of the first driven axle and a power take-off for the second driven axle, the two differentials being spur-gear-type planetary gears with parallel axes, the sun wheels of which are in each case connected in terms of drive to the half axles of the first driven axle, and planet wheels of the two differentials meshing with their common ring gear, the one planet carrier being connected in a rotationally fixed manner to the housing and the other planet carrier being connected in terms of drive to the power take-off for the second driven axle.

An axle-drive unit of this type is disclosed in AT 405 923 B. In the latter, owing to the particular design and arrangement of the two differentials, optimum adaptation of the moment distribution ratio is achieved with a minimum outlay on construction. Provided between the driven housing, which contains the two differentials, and the power take-off for the second driven axle is a fluid friction clutch as a longitudinal differential lock. The latter is not only extremely bulky, it also has the disadvantage of acting only as a lock for the differential between the two axles. Locking of the other differential, the differential between the two wheels of the first driven axle, is not possible.

It is thus the object of the invention to achieve an at least limited locking both of the axle differential and of the longitudinal differential with a minimum outlay on construction.

According to the invention, this is achieved in that a) the housing has a machined inner surface which surrounds the ring gear with little clearance, b) the ring gear is so thin in the radial direction that it is deformed in a lobe-like manner by the radial component of the tooth forces exerted by the planet wheels, c) its outer circumferential surface thereby being placed against the inner surface of the housing in a manner producing friction at least locally, as a result of which a braking moment acts on the ring gear.

Locking thereby takes place without additional components between the housing and ring gear. Moreover: the lock acts both on the axle differential of the first driven axle and on the interaxle differential between the two driven axles. The locking behavior also complies with the requirements: the action occurs only at high torques, i.e. when it is actually required, but not in towing mode or during gentle cornering. Since the tooth forces between the planet wheels and ring gear are approximately identical in both differentials, the bending stresses over the axial length of the ring gear are also approximately the same. In addition, in the locked state, the housing exerts a supporting action on the ring gear limiting the local expansion, which prevents excessive deformation of the ring gear and tooth fractures. This is all of benefit to the service life of the ring gear.

In a preferred embodiment, the driven housing is divided in a radial plane, that part of the housing which forms the inner surface rises above the radial plane of separation and an undercut is provided between this part and the radial surface. This undercut is used for decoupling screwing stresses caused by the bolts acting on the outside of the housing parts and thermal stresses caused by heating of the inner surface in the locking mode. That part of the housing which forms the inner surface thereby remains dimensionally accurate. A further contribution to this resides in the housing part with the inner surface having radial cooling ribs on its outside. This enlarges the area for the transfer of heat to the oil or to the surrounding transmission atmosphere.

There is great design freedom for the design of the frictional surfaces—both of the inner surface of the housing and of the outer circumferential surface of the ring gear. Machined, raised zones of limited axial width have proven advantageous. The reduction in the contact area may result in a reduction in the required contact pressure for a certain braking action and makes it easier to keep to the functionally desired, exacting tolerances.

BRIEF DESCRIPTION OF THE DRAWINGS

The invention will be described and explained below with reference to figures of an exemplary embodiment, in which.

DETAILED DESCRIPTION

Figure 1:
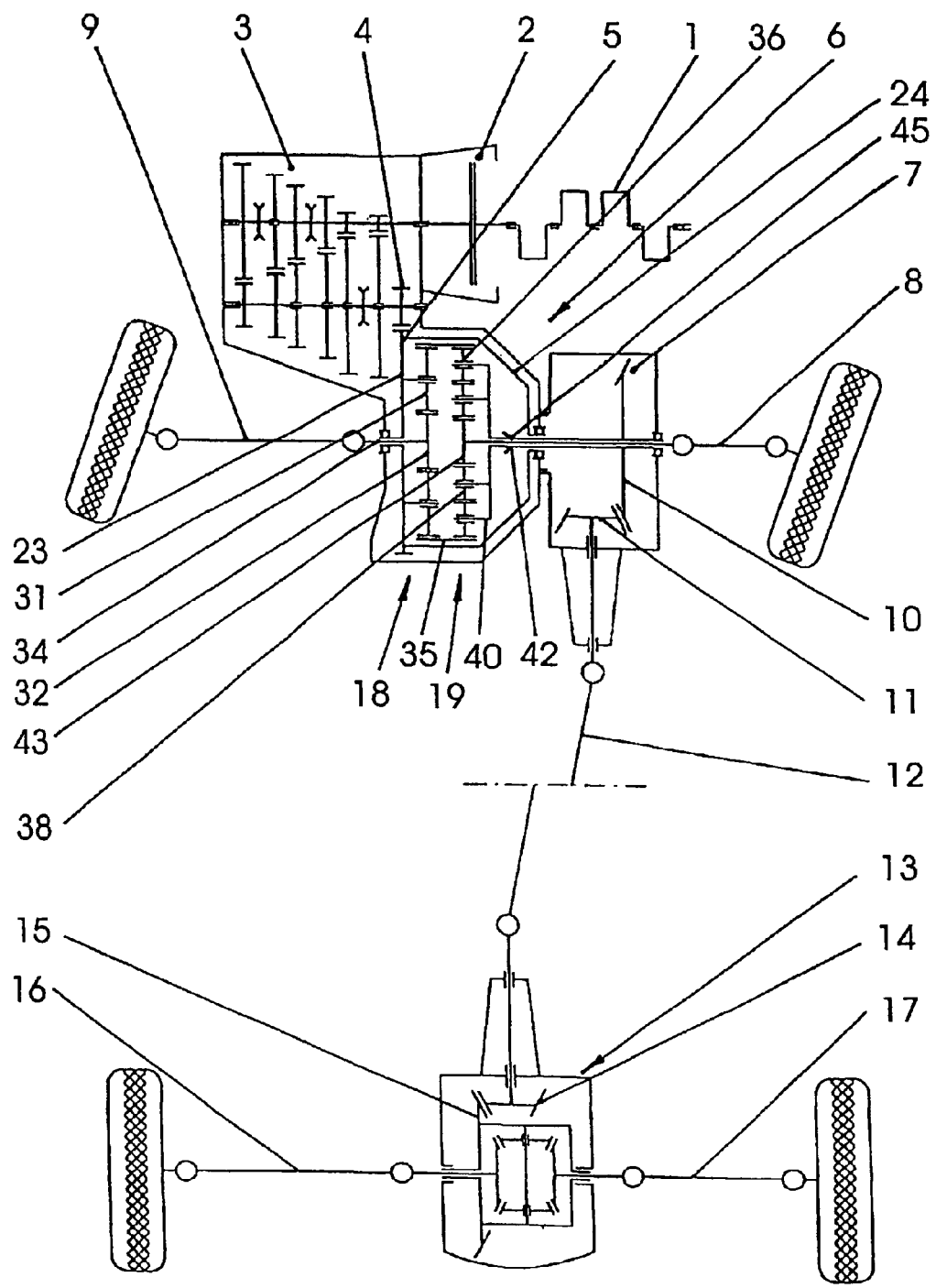
FIG. 1 shows a diagrammatic view of the entire axle-drive unit.

In the all-wheel-drive motor vehicle illustrated in FIG. 1, the engine is referred to by 1, the clutch by 2, and the manual transmission by 3. The transmission 3 ends in a driven gearwheel 4 which meshes with a large driving gearwheel 5. The driving gearwheel 5 is already part of the axle-drive unit 6. The latter is adjoined by a power take-off 7 for the rear axle drive and by a right and a left half axle 8, 9 for the drive of the front wheels. Located in the interior of the power take-off 7 is a pair of bevel gears 10, 11, and the torque for the rear axle is fed via a propeller shaft 12 to a, for example, conventional differential transmission 13, in which the half axles 16, 17 of the rear wheels are driven in a known manner via a pair of bevel gears 14, 15. A first and a second planetary gear 18, 19 are located in the interior of the axle-drive unit 6 and will be described in greater detail below.

Figure 2:
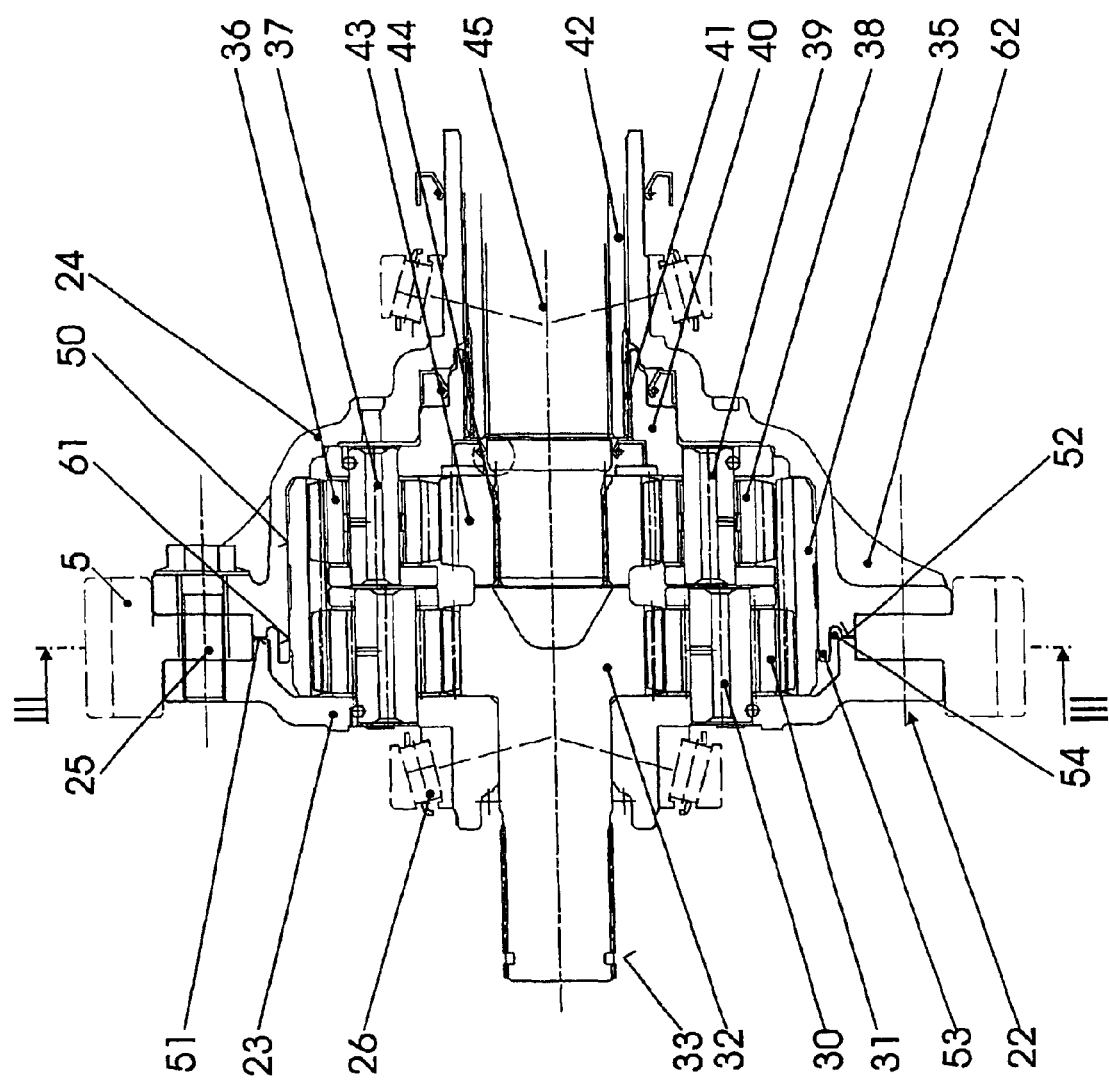
FIG. 2 shows an axial section through the double differential.

The rotating part of the axle-drive unit illustrated in FIG. 2 is, starting from the driving gearwheel 5, a driven housing 22 which contains the two planetary gears 18, 19. The housing 22 comprises two housing parts 23, 24 which are jointly clamped together here to the driving gearwheel 5 by means of threaded bolts 25. The axial position of the joint between the two housing parts can be established in accordance with external requirements; either the two housing parts can have the same depth or one of the housing parts is a flat cover and the other is a deep bell.

The first housing part 23 is at the same time the planet carrier of the first differential transmission 18 and is connected fixedly to the bell-shaped housing part 24 by means of the threaded bolts 25. The two together thus form a rigid part which is mounted rotatably in the housing 20, 21 by means of bearings 26, 27. This first planetary gear 18 also includes planet wheels 31 which can rotate about axes 30 and a sun wheel 32, which is connected by means of a wedge-shaped toothing 33 to the left output shaft 34 to which the half axle 9 (FIG. 1) is connected.

A ring gear 35 surrounds the planet wheels 31 of the first planetary gear 18 and is at the same time also the ring gear of the second planetary gear 19. It meshes with the outer planet wheels 36 of the second planetary gear 19, which planet wheels are mounted on spindles 37 which, for their part, are fastened in the second planet carrier 40. The first planet wheels 36 also mesh with second planet wheels 38 which are likewise mounted on the planet carrier 40 on spindles 39.

This second planet carrier 40 is connected via a wedge-shaped toothing 41 to a hollow shaft 42 which leads into the power take-off 7 for the rear axle (FIG. 1). The inner planet wheels 38 mesh with a sun wheel 43 which is connected via a wedge-shaped toothing 44 to the right output shaft 45. The latter leads via the right axle-drive shaft 8 (FIG. 1) to the right front wheel.

The power flux runs as follows: the torque received by the large driving gearwheel 5 is firstly divided in the first planetary gear 18 between the sun wheel 32, and hence the left, front axle-drive shaft 9, on the one hand, and the hollow gear 35, on the other hand. The latter constitutes the connection between the first and second planetary gear. The torque fed in this manner to the second planetary gear 19 is divided via the planet wheels 36, 38 to, on the one hand, their planet carriers 40, and hence to the power take-off 7 for the rear wheels, and, on the other hand, to the sun wheel 43, and hence to the right half axle 8 of the front wheel drive.

According to the invention, the housing part 24 and the ring gear 35 are designed in a particular manner. The housing part 24 has a machined, cylindrical inner surface 50 which is extended over most of the axial width of the ring gear 35. It furthermore has a radial surface 51 which lies approximately in the radial plane of separation. Threaded bolts 25 are furthermore provided on the outside in flanges, for the purpose of connecting the two housing parts. A further radial surface 52 is provided on the other housing part 23. The inner surface 50 extends into a collar 53 rising above the radial surfaces 51, 52. An undercut 54 is provided between said collar and the radial surface 51 and is used for the purpose of keeping thermal stresses away from the radial surface 51 and tensile stresses away from the inner surface 50.

Figure 3:
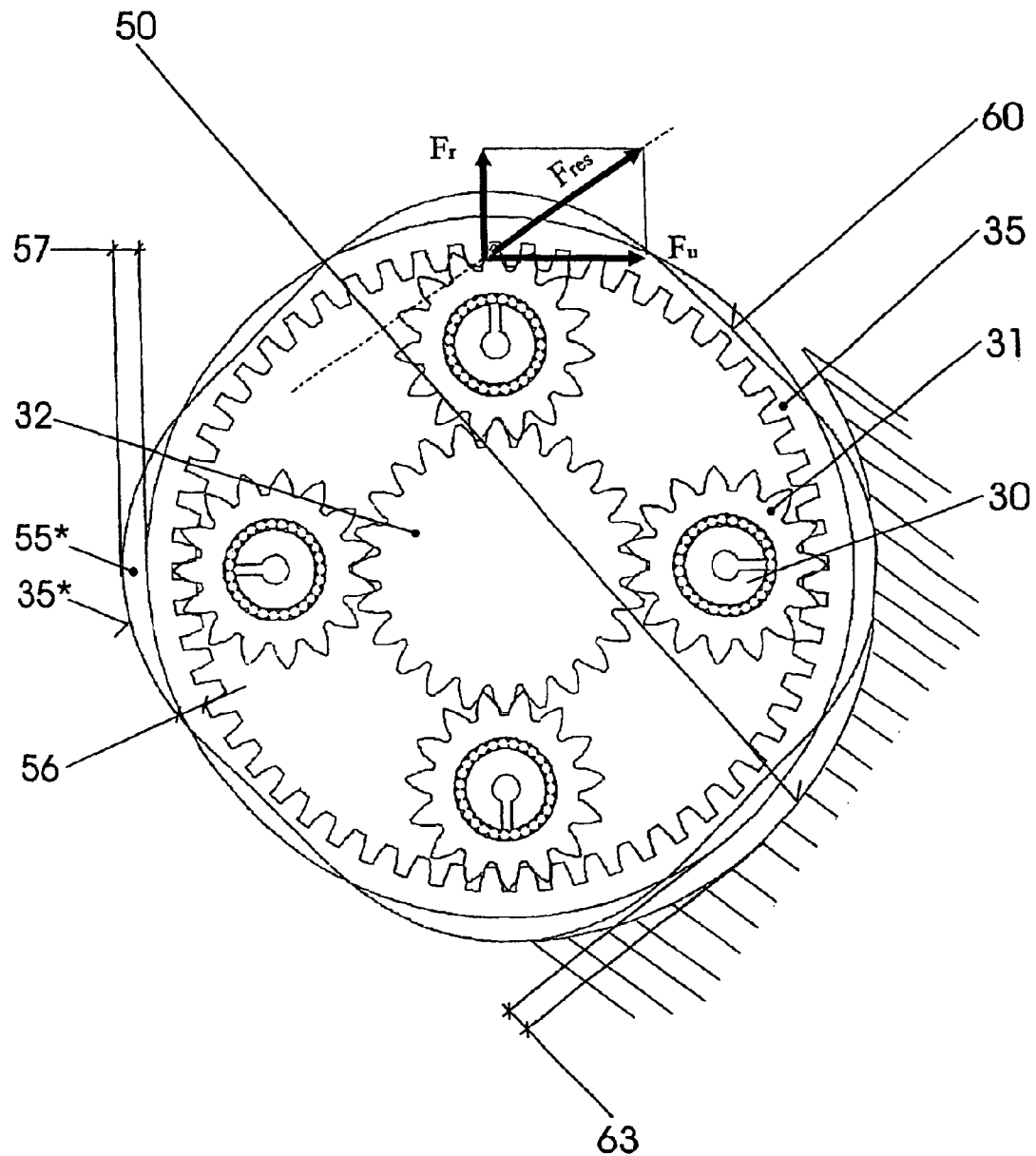
FIG. 3 shows a radial section according to III—III in FIG. 2.

FIG. 3 shows the ring gear 35 in radial section. It is dimensioned in such a manner that it is deformed under the radial component $F_R$ of the tooth forces F exerted by the planet wheels 31 (four in this case) to form a lobe-shaped element 35* having convexities 55* (in this case four), this being illustrated by hatching and in a greatly exaggerated manner. For this purpose, the radial thickness 56 of the ring gear is selected to be of such a small size that the circumferential surface 60 of the ring gear 35 is deformed outward theoretically by an amount 57 at the points of engagement of the planet wheels 31; of course, the zones, lying in between, of the ring gear 35 are displaced inward. However, this does not occur during operation because the outwardly displaced parts of the circumferential surface 60 are previously placed against the inner surface 50 of the driven housing. The frictional connection brought about in this manner causes an at least partial locking of the two differentials. For the sake of completeness, it should be added that the planet wheels 36 of the second planetary gear 19 exert the same action on the ring gear 35.

The frictional connection can be optimized by the design of the circumferential surface 60 and of the inner surface 50. For this purpose, use can be made of suitable surface treatment processes. In the exemplary embodiment shown, again FIG. 2, the axial width which is limited by two raised zones 61 is achieved on the circumferential surface 50 of the ring gear. In order to improve the conduction of heat, radial cooling ribs 62 are furthermore also provided on the housing part 24 and they also reinforce the housing.

What is claimed is:

1. An axle-drive unit for a motor vehicle having a first and a second driven axle which comprises a first and a second differential (18, 19) in a housing driven by an engine/transmission block (1), the first differential (18) dividing the torque fed to it between a first half axle (9) of the first driven axle (8, 9) and the second differential (19), and the second differential (19) furthermore dividing the torque fed to it between a second half axle (8) of the first driven axle (8, 9) and a power take-off (7) for the second driven axle (16, 17), the two differentials (18, 19) being spur-gear planetary gears with parallel axes, the sun wheels (32, 43) of which are in each case connected in terms of drive to the half axles (8, 9) of the first driven axle, and planet wheels (36, 38) of the two differentials (18, 19) meshing with their common ring gear (35), a first planet carrier (23) being connected in a rotationally fixed manner to the housing and a second planet carrier (40) being connected in terms of drive to the power take-off (7) for the second driven axle, wherein a) the housing (22) has a machined inner surface (50) which surrounds the ring gear (35) with a clearance (63), b) the ring gear (35) is so thin in the radial direction that it is deformed in a lobe-like manner (35*) by a radial component ($F_R$) of tooth forces exerted by the planet wheels (31, 36), c) the ring gear outer circumferential surface (60) thereby being placed against the inner surface (50) of the housing (22) in a manner producing friction at least locally, and a braking moment thereby acting on the ring gear (35).

2. The axle-drive unit as claimed in claim 1, wherein the housing is a driven housing (22) which is divided in a radial plane into two housing parts (23, 24), wherein that part of the housing (24) which forms the inner surface (50) rises above the radial plane of separation and has an undercut (54) between this part and a radial surface (51).

3. The axle-drive unit as claimed in claim 2, wherein the housing part (24) with the inner surface (50) has radial cooling ribs (62) on its outside.

4. The axle-drive unit as claimed in claim 1, wherein the circumferential surface (60) of the ring gear (35) has machined, raised zones (61) of limited axial width.

* * * * *